(12) United States Patent
Sullivan

(10) Patent No.: US 7,066,839 B2
(45) Date of Patent: Jun. 27, 2006

(54) GOLF BALLS INCLUDING A STAGED RESIN FILM AND METHODS OF MAKING SAME

(75) Inventor: Michael J. Sullivan, Barrington, RI (US)

(73) Assignee: Acushnet Company, Fairhaven, MA (US)

( * ) Notice: Subject to any disclaimer, the term of this patent is extended or adjusted under 35 U.S.C. 154(b) by 122 days.

(21) Appl. No.: 10/805,203

(22) Filed: Mar. 22, 2004

(65) Prior Publication Data

US 2004/0180735 A1 Sep. 16, 2004

Related U.S. Application Data

(62) Division of application No. 09/923,071, filed on Aug. 6, 2001, now Pat. No. 6,827,657.

(51) Int. Cl.
*A63B 37/06* (2006.01)

(52) U.S. Cl. ...................................................... 473/374

(58) Field of Classification Search ................. 473/373, 473/374, 378
See application file for complete search history.

(56) References Cited

U.S. PATENT DOCUMENTS

| | | | |
|---|---|---|---|
| 1,568,513 A | 1/1926 | Lewis | |
| 1,904,012 A | 4/1933 | Reichard | |
| 3,130,102 A * | 4/1964 | Watson et al. | 156/228 |
| 3,965,055 A * | 6/1976 | Shichman et al. | 525/176 |
| 3,989,568 A * | 11/1976 | Isaac | 156/182 |
| 4,197,377 A * | 4/1980 | Bohm et al. | 525/99 |
| 4,695,055 A | 9/1987 | Newcomb et al. | 273/213 |
| 4,878,674 A | 11/1989 | Newcomb et al. | 273/213 |
| 5,006,297 A * | 4/1991 | Brown et al. | 264/234 |
| 5,150,906 A | 9/1992 | Molitor et al. | 273/220 |
| 5,480,155 A | 1/1996 | Molitor et al. | 273/220 |
| 5,730,665 A | 3/1998 | Shimosaka et al. | 473/376 |
| 5,733,428 A * | 3/1998 | Calabria et al. | 264/134 |
| 5,749,796 A | 5/1998 | Shimosaka et al. | 473/365 |
| 5,836,833 A | 11/1998 | Shimosaka et al. | 473/365 |
| 5,997,417 A | 12/1999 | Lutz | 473/377 |
| 6,010,411 A | 1/2000 | Reyes | 473/345 |
| 6,015,356 A | 1/2000 | Sullivan et al. | 473/373 |
| 6,056,842 A | 5/2000 | Dalton et al. | 156/243 |
| 6,068,561 A | 5/2000 | Renard et al. | 473/364 |
| 6,083,119 A | 7/2000 | Sullivan et al. | 473/354 |
| 6,117,024 A * | 9/2000 | Dewanjee | 473/351 |
| 6,132,544 A | 10/2000 | Ihara | 156/146 |
| 6,166,164 A | 12/2000 | Gras | 528/45 |
| 6,180,040 B1 | 1/2001 | Ladd et al. | 264/248 |
| 6,180,722 B1 | 1/2001 | Dalton et al. | 525/193 |
| 6,221,998 B1 | 4/2001 | Okuhira et al. | 528/68 |
| 2005/0020796 A1* | 1/2005 | Dewanjee | 528/44 |

FOREIGN PATENT DOCUMENTS

JP 61-112619 A 5/1986

* cited by examiner

*Primary Examiner*—Raeann Gorden
(74) *Attorney, Agent, or Firm*—Bingham McCutchen LLP

(57) ABSTRACT

The present invention is directed towards a golf ball wherein at least one portion of the golf ball is formed from a staged resin film that may contain fillers or additives to alter the physical or chemical characteristics of the ball, such as its weight distribution, its moment of inertia, and its moisture transmission properties. The invention also relates to methods of forming a golf ball having a portion formed from a staged resin film.

17 Claims, 1 Drawing Sheet

GOLF BALLS INCLUDING A STAGED RESIN FILM AND METHODS OF MAKING SAME

This application is a divisional of U.S. patent application Ser. No. 09/923,071, filed Aug. 6, 2001, now U.S. Pat. No. 6,827,657, the entire disclosure of which is incorporated by reference herein.

FIELD OF THE INVENTION

This invention relates generally to golf balls, and more specifically, to a multilayer golf ball. In particular, this invention relates to a golf ball having at least one portion formed from a staged resin film, as well as methods for forming at least one portion of a golf ball from a staged resin film.

BACKGROUND OF THE INVENTION

Various golf balls, golf ball layers, and methods of making golf balls are known in the art. Generally, golf balls have been classified as two piece balls or three piece balls. Two piece balls are comprised of a solid polymeric core and a cover. Two piece balls are generally easy to manufacture, but are regarded as having limited playing characteristics. Three piece balls are comprised of a solid or liquid-filled center surrounded by tensioned elastomeric material and a cover. Three piece balls generally have good "feel" when struck by a golf club, but are more difficult to manufacture than two piece balls.

The prior art is comprised of various golf balls that have been designed to optimize playing characteristics. These characteristics are generally the initial velocity and spin of the golf ball. For instance, certain players prefer to play a ball that has a high spin rate for playability. Other players prefer to play a ball that has a low spin rate to maximize distance. Therefore, golf ball manufacturers are continually searching for new ways in which to provide golf balls that deliver the maximum performance for golfers that demand varied playing characteristics.

Golf balls are presently formed from a variety of materials depending upon the performance characteristics desired. One of the softest materials conventionally used to form golf ball covers is balata, which is the trans-isomer form of the 1,4-chain polymer of isoprene. For many years, balata was the standard cover stock material used in forming most golf balls. Balata covered balls were favored among professionals and more advanced amateur players until recently because the softness of the cover allows the player to achieve spin rates sufficient to precisely control ball direction and distance, particularly on shorter approach shots.

Because of its softness, however, balata is susceptible to cuts or other damage to the cover resulting from a mis-hit shot. Accordingly, harder, more durable cover materials, e.g., ionomer resins such as SURLYN®, have been developed that provide higher durability, but less spin and feel, than balata balls. Resins such as SURLYN® are generally ionic copolymers of an olefin, such as ethylene, and a metal salt of an unsaturated carboxylic acid, such as acrylic acid, methacrylic acid, or maleic acid. Metal ions, such as lithium, zinc, or sodium, are used to neutralize some portion of the acidic groups in the copolymer resulting in a thermoplastic elastomer for use as a golf ball cover. Additionally, various softening comonomers, such as n-butyl acrylate, may be added during the ionomer manufacturing process to improve golf ball performance characteristics, such as spin and feel.

In the early 1980s, low modulus SURLYN® ionomers were introduced and subsequently utilized to impart more spin and an improved, balata-like feel to golf balls.

Golf balls may be provided with a coating of one or more layers to protect the cover. Golf balls must be capable of withstanding a variety of weather conditions, such as strong sunlight, extreme temperature ranges, and immersion in water, preferably for an extended period. Further, the surface of a golf ball is flexed due to the impact every time it is struck with a club and, consequently, these surfaces must be able to withstand such repeated stresses. Moreover, especially with the recreational player, golf balls are susceptible to striking any of a number of hard, abrasive surfaces, such as concrete, asphalt, brick, stone, etc., as a result of errant shots. It is therefore desirable for golf ball manufacturers that their golf balls be resistant to delamination or chipping of the coating layers, as such defects impact negatively upon the public perception of the quality of the golf ball.

Likewise, golf ball manufacturers also seek to prevent obliteration of all or part of their trademarks, logos, or other identifying indicia that identifies the brand of the ball to the playing public. Protective coatings are therefore applied to the surface of the golf ball cover. A clear primer coat and top coat layer are commonly applied to the cover to provide a high gloss and an overall enhanced appearance to the ball. In such coated balls, the various identifying indicia may be applied either to the cover, the primer coat, or the topcoat.

Protective and decorative coating materials, as well as methods of applying such materials to the surface of golf ball covers, are well known in the golf ball art. Generally, such coating materials comprise urethanes, urethane hybrids, polyesters, and acrylics. If desired, more than one coating layer may be used. Typical two pack polyurethane coatings include separate packages of polyol and diisocyanate. Conventionally, a primer layer, such as a solvent-based or a water-based polymer, may be applied to promote adhesion or to smooth surface roughness before the finish coat(s) are deposited on the golf ball. In general, a cured polyurethane-based top coat is most widely used as a protective coating material.

U.S. Pat. No. 5,749,796 discloses a wound golf ball having a resin film as a second cover layer that is disposed about the first cover layer, the second cover layer having a thickness of less than 300 microns U.S. Pat. No. 5,997,417 discloses a golf ball having an in-mold coating with a substantially uniform thickness of about 0.05 to 100 mils, the coating being applied to a dimpled cover.

U.S. Pat. No. 5,836,833 discloses a golf ball having an outer cover layer of ionomer, polyurethane, or ethylene vinyl acetate, having a thickness of 0.01 to 0.05 mm and a Shore D hardness of 48 to 55, and an inner cover layer having a thickness of 1.2 to 4.0 mm and a Shore D hardness of 58 to 70.

U.S. Pat. No. 6,068,561 discloses a golf ball with a multi-piece cover having at least three layers, each layer having a different hardness and a thickness of about 0.01 to 0.03 inches.

Japanese Patent No. 61-112619 discloses a wound multilayer golf ball having a protective thermoplastic layer having a thickness of 10 to 500 microns.

The varied composition and manufacturing of other portions of golf balls is also well known in the art.

Both U.S. Pat. Nos. 1,568,513 and 1,904,012 are directed to wound golf balls with liquid filled centers.

U.S. Pat. Nos. 5,150,906 and 5,480,155, are directed to as hollow spherical shell of a polymeric material which is filled with a liquid or unitary, non-cellular material that is a liquid when introduced into the shell. The shell is disclosed as being the outer cover or an inner layer with the outer cover formed to the external surface thereof. The shell varies in thickness from about 1.52 to 10.41 mm in thickness.

U.S. Pat. No. 6,132,544 discloses a method of molding a solid golf ball including disposing a core between two ionomer resin films and heat pressing the films to the wrapped ball body in a dimpling mold to form the cover.

U.S. Pat. No. 5,730,665 discloses a three-piece golf ball, wherein the intermediate layer and the outermost layer of formed of a laminate film made from a material that is smoothly releasable from the mold. The intermediate layer has a thickness of 50 to 400 microns and the outermost layer has a thickness of 5 to 100 microns.

Particularly with respect to polyurethane-containing materials golf balls can be currently made by casting or injection molding processes. The nature of current casting processes is such that materials that require a relatively long time (in comparison to other fabrication methods) to sufficiently solidify, i.e., react thoroughly. As a result, materials or compounds with particular chemistries that react or solidify relatively quickly are generally restricted from use in commercial casting processes, particularly in the golf art.

By using an alternative fabrication technique, reaction injection molding, as opposed to traditional injection molding, thermosetting materials and/or materials with relatively quick reaction or solidification times can be processed. Reaction injection molding processes, due to the nature of the chemistries of the materials used, tend to result in decreased fabrication times, and can facilitate a decrease in the cost of fabricating such articles. The technique of reaction injection molding using a variety of materials has been demonstrated in various publications.

Reaction injection molding has been disclosed in International Publication No. WO 00/57962, which claims golf balls, and processes for making such balls, comprising a reaction injection molded material, such as polyurethanes/polyureas.

In addition, U.S. Pat. No. 6,083,119 discloses a multi-layer golf ball with an inner and outer cover layer, at least one of which can contain a reaction injection molded polyurethane material.

U.S. Pat. Nos. 4,695,055 and 4,878,674 also disclose illuminated, translucent golf balls having a permanent diametric hole into which a chemiluminescent light stick is added, so that the golf balls may be visible in the dark. These golf balls can be fabricated by a method such as reaction injection molding.

Until recently, compounds that can be cured in to urethanes, such as isocyanates and hydroxyl-containing polymers, had to be stored separately and were mixed at the time of their use. However, chemically modifying, "blocking" or "masking," the reactive substances now permits one-part curable compositions.

U.S. Pat. No. 6,221,998 discloses an isocyanate-based one-part moisture curable composition having excellent storage stability and high curing rate. The composition comprises an isocyanate and a ketimine that are chemically blocked so that the initiation of curing can be controlled.

U.S. Pat. No. 6,166,164 discloses blocked polyisocyanates with a high latent isocyanate content used for the production of heat-curable polyurethane polymer coating systems.

SUMMARY OF THE INVENTION

The present invention is directed to a golf ball having at least one portion that is molded from a partially cured thermosetting resin composition, also called a staged resin film ("SRF"). The SRF may be in the form of a malleable sheet to allow for alternatives in handling the material. The thickness of the SRF may depend upon which portion of the golf ball is to be molded from the SRF, and the SRF may be supported by a substrate or fabric, which may be removed from the SRF just prior to use. Alternatively, the SRF may be laminated with any number of additional layers of material prior to molding and/or be pre-molded into shells.

In one embodiment of the invention, the SRF may include a specific gravity increasing or specific gravity decreasing material.

In another embodiment of the invention, the SRF may include an additive that alters moisture transmission.

In an additional embodiment of the invention, the SRF is substantially unfilled comprising only the partially cured polymeric composition and additives such as, but not limited to, curatives, colorants, stabilizers, viscosity modifiers, and inhibitors.

The invention also relates to a method of molding the SRF to form one or more portions of a golf ball such as a core, intermediate layer, or cover layer. The SRF, in the form of a sheet, with or without a support substrate or fabric, may be molded over a solid, wound, or fluid-filled core. If the SRF is not the outermost portion of the golf ball, the SRF portion may be molded over with at least one similar or different SRF and/or at least one conventional material used in making a golf ball.

In an additional embodiment of the invention, the method may include at least partially curing a molded portion formed from the SRF with, but not limited to, ultraviolet light, ebeam, gamma radiation, heat and/or time to allow for full cure of all reactive groups in the SRF.

BRIEF DESCRIPTION OF THE DRAWINGS

Further features and advantages of the invention can be ascertained from the following detailed description that is provided in connection with the drawings described below.

DETAILED DESCRIPTION OF THE PREFERRED EMBODIMENTS

Figure 1:
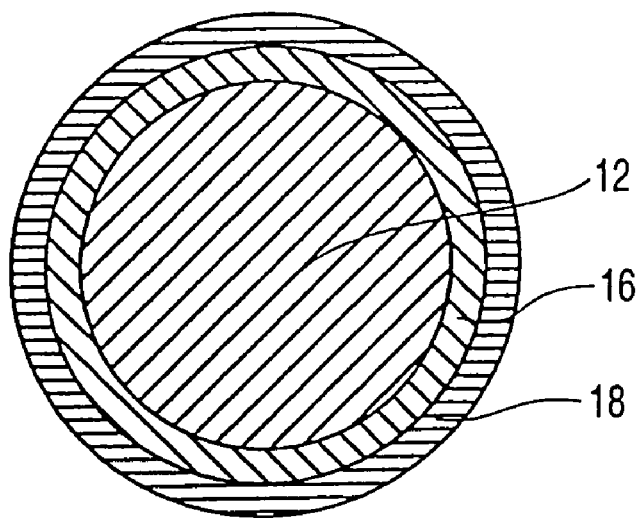
FIG. 1 is a cross-sectional view of a two-piece golf ball including one or more staged resin film layers.

The present invention is directed to a portion or portions of a golf ball formed from a staged resin film ("SRF"). The SRF includes at least one crosslinkable resin, preferably including one or more of, but not limited to, a polyurethane, polyurea, epoxy, diene rubber, unsaturated polyester, silicone. The above mentioned polyurethane may be produced from a partially or totally blocked polyisocyanate. The SRF may also include an interpenetrating polymer network, a partially or totally blocked polyisocyanate, or an isocyanate compound that has a ketimine, which may be derived from a ketone or an aldehyde and an amine having a branched carbon atom or a ring member carbon atom bond at the α-position, and all of the isocyanate groups bonded to secondary or tertiary carbons. The extent to which the crosslinkable resin is partially cured may be based on Shore D hardness. In the present invention, a SRF may have a Shore D hardness that is 10 to 80% of the crosslinkable resin's ultimate hardness as measured using ASTM D-2240. A SRF may also be 10 to 80%, more preferably 10 to 70% and most preferably 20 to 60%, of the crosslinkable resin's ultimate tensile strength as measured using ASTM K-638 or flexural modulus as measured using ASTM D-790.

For the purposes of this application, a "portion" is defined as a core; any part of a core, such as, but not limited to, a core shell; any part of a cover layer, including but not limited to an inner cover layer, an outer cover layer, or a coating; and an intermediate layer, which is positioned between the core and the cover layer or between inner and outer covers. A portion of a golf ball formed from a SRF will typically comprise at least one crosslinkable resin and may further contain one or more additives necessary to achieve the desired properties of the portion of a golf ball to be formed. A portion of a golf ball formed from a SRF may be an alternative to a cast or injection molded portion and permits ball designs with more specific weight distribution and alterations in moisture transmission. Because the SRF contains partially cured cross-linkable resins, a SRF provides additional alternatives in handling and molding than those provided with uncured material.

The cross-linkable resin of a SRF may include, but is not limited to, a polyurethane, polyurea, polyurethane ionomer, epoxy, diene rubber, unsaturated polyester, silicone, interpenetrating polymer network, or any combination thereof. The SRF should be flexible enough that it will not readily fracture or degrade from ordinary use. Preferably, the SRF is in the form of a malleable sheet for ease of handling and processing. The SRF may be supported by a substrate or fabric from which it can be readily peeled from just prior to molding over a portion of the golf ball. The substrate or fabric may also remain attached to the SRF and be incorporated into the golf ball.

The fillers that may be added to the SRF are used to modify the cost, density, hardness, flexural modulus, barrier properties, resilience, color, viscosity, handling, or virtually any other physical or chemical property of the SRF layer. For example, a density adjusting filler may be used to control the moment of inertia, and thus the initial spin rate of the ball and spin decay. As used herein, the term "fillers" includes any compound or composition that can be used to vary the density and other properties of the subject SRF layer. Fillers are typically polymeric or inorganic in nature, and, when used, are typically present in an amount from about 0.1 to 50 weight percent of the layer or portion in which they are included. Any suitable filler available to one of ordinary skill in the art may be used. Exemplary fillers include, but are not limited to, precipitated hydrated silica; clay; talc; glass fibers; aramid fibers; mica; calcium metasilicate; barium sulfate; zinc sulfide; lithopone; silicates; silicon carbide; diatomaceous earth; carbonates such as calcium carbonate and magnesium carbonate; metals such as titanium, tungsten, aluminum, bismuth, nickel, molybdenum, iron, copper, boron, cobalt, beryllium, zinc, and tin; metal alloys such as steel, brass, bronze, boron carbide whiskers, and tungsten carbide whiskers; metal oxides such as zinc oxide, iron oxide, aluminum oxide, titanium oxide, magnesium oxide, and zirconium oxide; particulate carbonaceous materials such as graphite, carbon black, cotton flock, natural bitumen, and cellulose flock; micro balloons such as glass and ceramic; fly ash; cured, ground rubber; regrind (which is recycled core material ground to about 30 mesh particle size); cured SRF; composite or polymeric microspheres, chopped crosslinked polymeric foam particles, such as polyurethane, polyethylene, metallocene polymers, ionomers, and others; or combinations thereof.

In one embodiment of the invention, the SRF may be part of a laminate. For example, the SRF may be sandwiched between two layers of a crosslinkable, uncured or partially cured sheet of polybutadiene rubber formulation. Such a sheet of polybutadiene rubber is described in U.S. Pat. No. 6,056,842. The entire laminated sheet is then used in the formation of a portion of a golf ball. Alternatively, a sheet of polybutadiene based material having a thickness of less than 0.51 mm may be positioned between two layers of SRF.

In another embodiment, the SRF may contain one or more additives that alters the transmission of moisture or vapor through a golf ball. Moisture from the atmosphere may cause a reduction in the golf ball's coefficient of restitution, or change the ball compression, size, weight, or other properties. The loss of moisture or other volatile components from a fluid-filled core to the atmosphere or into the cover layer, may also change the ball's properties, such as its coefficient of restitution, weight, size, compression, or others. As used herein, a "fluid-filled" core refers to a golf ball core that is either liquid-filled, or has a hollow center, thus being gas-filled. Examples of materials that will reduce or inhibit vapor transmission include, but are not limited to, mica, polyvinylidene chloride based formulations, ethylene vinyl alcohol, vermiculite, fluorine containing polymers, and any organic, inorganic, or blend of materials that alters the transmission of moisture through the at least partially cured SRF composition. Thus, SRF may be positioned around a liquid filled center having a diameter of 12.70 to 31.75 mm. In another embodiment, the SRF is positioned between a urethane cover layer and a core of a polybutadiene based material.

In another embodiment of the invention, the SRF composition does not contain fillers. It may instead contain other additives, such as, but not limited to, one or more colorants, stabilizers, viscosity modifiers, or inhibitors. It may also be used to provide better adhesion between layers that are not compatible.

The amount and type of filler utilized is governed by the amount and weight of other ingredients in the composition, since a maximum golf ball weight of 1.620 ounces has been established by the USGA. Appropriate fillers generally used range in specific gravity from about 0.5 to 20.0 g/cc. More dense fillers may be used to increase the specific gravity of the SRF while less dense fillers may be used to reduce the specific gravity of the SRF. The thickness of the SRF layer depends on the application for which it is applied and the number of plys if used as laminated sheets. The layer may range from about 0.001 to 0.05 inches for a very thin layer, or greater than about 1.27 mm for a thicker layer. A laminated, multilayered embodiment may have a thickness of up to about 6.35 mm, preferably about 0.25 to 1.27 mm. In one preferred embodiment, the laminated SRF has a thickness of less than about 0.89 mm and is positioned between the ball cover and core.

FIG. 1 shows a golf ball core of the present invention including a center 12, an intermediate layer 16, and a cover layer 18. According to the present invention, any one or more of the center 12, the intermediate layer 16, or the cover layer 18 may be formed from a SRF. Preferably, the SRF forms a very thin intermediate layer having a thickness of less than 0.51 to 0.76 mm between the cover and the core. Alternatively, the SRF may form a layer between the cover and the inner layer or between the inner layer and the cover. In this embodiment, the SRF layer is preferably less than 0.13 mm thick. In another embodiment, the SRF forms the cover layer. Preferably, the SRF is used to form a cover layer having a thickness of less than 1.27 mm and more preferably less than 0.51 mm.

Figure 2:
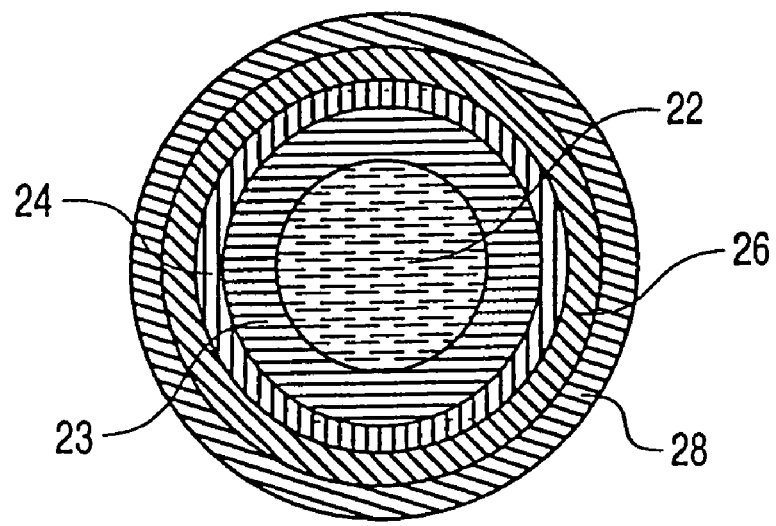
FIG. 2 is a cross-sectional view of a three-piece fluid-filled golf ball including one or more staged resin film layers.

FIG. 2 shows a golf ball of the present invention that includes a core 22, that may be fluid-filled within a core shell 23, a first intermediate layer 24, a second intermediate layer 26, and a cover layer 28. Any one of the core, the core shell, the intermediate layer, the second intermediate layer, and the cover may be formed from a SRF or any material known to those of ordinary skill in the art. Preferably, the SRF is the first intermediate layer and the second intermediate layer is a solid polybutadiene based material. Most preferably, the shell is comprised of a polyether ester or the like and the SRF forms a layer over the shell.

The present invention is also directed to a method of forming a golf ball wherein a portion of the golf ball is formed from a SRF. The SRF may be pre-molded into shells, in the form of a laminate, or be supported by a fabric or substrate, which can be readily peeled from the SRF prior to molding or not removed so that the fabric or substrate forms a portion of the golf ball. The SRF may be compression molded or vacuum pressure may be used to facilitate the curing or molding of any of these embodiments. Where the portion of the golf ball formed from a SRF is not the outermost portion of the ball, the formed part may be molded over with one or more cover materials by compression molding, injection molding, reaction injection molding, spraying, dipping, casting, laminating, or any other conventional means. The ball may then be finished by application of a coating or paint layer. When the ball is removed from the mold, it may be further cured or post-cured by UV, electron beam, gamma, heat, or time to allow for additional curing of all of the reactive groups in the golf ball.

While it is apparent that the illustrative embodiments of the invention herein disclosed fulfills the objectives stated above, it will be appreciated that numerous modifications and other embodiments may be devised by those skilled in the art. All patents cited in the foregoing text are expressly incorporated herein by reference in their entirety.

What is claimed is:

1. A method of making a golf ball comprising:
    partially curing a crosslinkable resin to form a staged resin film;
    sandwiching the staged resin film between two layers of polybutadiene-based material to form a laminate;
    applying the laminate to a core.

2. The method of claim 1, further comprising the step of: forming a cover over the laminate.

3. The method of claim 1, wherein the step of partially curing further comprises adding at least one material that alters moisture or vapor transmission through the laminate.

4. The method of claim 1, wherein the crosslinkable resin comprises a polyurethane, polyurea, epoxy, diene rubber, unsaturated polyester, silicone, and mixtures thereof.

5. The method of claim 1 further comprising molding at least one second staged resin film over the laminate.

6. The method of claim 4, wherein the polyurethane comprises a partially or totally blocked isocyanate.

7. A method of making a golf ball component comprising:
    partially curing a crosslinkable resin to form a staged resin film having a Shore D hardness that is about 10 percent to about 80 percent of a completely cured staged resin film, wherein the crosslinkable resin comprises a partially or totally blocked isocyanate, an interpenetrating polymer network, an isocyanate compound comprising a ketimine, or mixtures thereof;
    forming a portion of the golf ball with the staged resin film.

8. The method of claim 7, wherein the step of partially curing a crosslinkable resin results in a staged resin film having a Shore D hardness that is about 20 percent to about 60 percent of a completely cured staged resin film.

9. The method of claim 7, wherein the step of forming further comprises the steps of:
    providing a core; and
    forming the staged resin film about the core.

10. The method of claim 7, wherein the crosslinkable resin comprises polyurethane, polyurea, epoxy, diene rubber, unsaturated polyester, silicone, or mixtures thereof.

11. The method of claim 7, wherein the step of forming a portion of a golf ball further comprises the steps of:
    forming the staged resin film into a pre-molded shell; and
    forming a portion of the golf ball with the pre-molded shell.

12. The method of claim 7, wherein the step of partially curing a crosslinkable resin further comprises adding at least one material that alters moisture or vapor transmission through the golf ball component.

13. A method of making a golf ball component comprising:
    partially curing a crosslinkable resin to form a staged resin film having a tensile strength that is about 10 percent to about 80 percent of a completely cured staged resin film, wherein the staged resin film comprises at least one of a partially or totally blocked isocyanate, an interpenetrating polymer network, an isocyanate compound comprising a ketimine, or mixtures thereof; and
    molding a portion of the golf ball with the staged resin film.

14. The method of claim 13, wherein the step of partially curing a crosslinkable resin results in a staged resin film having a tensile strength that is about 20 percent to about 60 percent of a completely cured staged resin film.

15. The method of claim 13, wherein the step of partially curing further comprises adding at least one material that alters moisture or vapor transmission through the portion of the golf ball.

16. The method of claim 13, wherein the step of molding a portion of the golf ball with the staged resin film further comprises the steps of:
    providing first and second sheets of polybutadiene rubber;
    sandwiching the staged resin film between the first and second sheets of polybutadiene rubber to form a laminate; and
    applying the laminate to a core.

17. The method of claim 13, wherein the step of molding a portion of the golf ball with the staged resin film further comprises the steps of:
    providing first and second sheets of staged resin film;
    providing a sheet of polybutadiene-based material;
    sandwiching the sheet of polybutadiene-based material between the first and second sheets of staged resin film to form a laminate; and
    applying the laminate to a core.

* * * * *